United States Patent [19]

Thumm

[11] Patent Number: 4,976,974

[45] Date of Patent: Dec. 11, 1990

[54] GRAPE JUICE CONCENTRATE AND DRINK

[75] Inventor: Hermann Thumm, Lyndoch, Australia

[73] Assignee: Chateau Yaldara PTY. Ltd., Lyndoch, Australia

[21] Appl. No.: 201,782

[22] Filed: Jun. 2, 1988

[51] Int. Cl.$^5$ .......................... A23L 2/02; A23L 2/26; A23L 2/08; C12G 1/02

[52] U.S. Cl. ....................................... 426/14; 426/15; 426/51; 426/599; 426/592; 426/330.4; 426/330.5; 426/494; 426/492

[58] Field of Search .................. 426/387, 592, 14, 15, 426/493, 494, 51, 599, 330.4–330.5, 422, 492

[56] References Cited

U.S. PATENT DOCUMENTS

| | | | |
|---|---|---|---|
| 1,362,870 | 12/1920 | Johnson | 426/327 |
| 1,381,613 | 6/1921 | Avis et al. | 426/599 |
| 1,870,588 | 8/1932 | Rooker et al. | 426/422 |
| 2,016,584 | 10/1935 | Ash et al. | 426/599 |
| 2,419,286 | 4/1947 | Rooker | 426/14 |
| 2,512,513 | 6/1950 | Zahm . | |
| 2,690,972 | 10/1954 | Bradshaw | 426/658 |
| 4,597,978 | 7/1986 | Dimitriou | 426/599 |
| 4,626,437 | 12/1986 | Schobinger et al. | 426/14 |

FOREIGN PATENT DOCUMENTS

| | | |
|---|---|---|
| 0066366 | 5/1973 | Australia . |
| 0068738 | 12/1973 | Australia . |
| 0105282 | of 1917 | United Kingdom . |
| 0135175 | of 1921 | United Kingdom . |

*Primary Examiner*—Marianne Cintins
*Attorney, Agent, or Firm*—Robert Louis Finkel

[57] ABSTRACT

In this invention, both a grape juice concentrate and a grape juice drink are produced by first preparing the raw material for a year's production during vintage, transferring grape juice so produced to a vacuum concentrating column before it ferments, heating the grape juice in the column and subjecting it to a low pressure (vacuum) to separate it into a distillate and a first stage grape juice concentrate which has a Baume of about 35, separate storing the first stage grape juice concentrate, remixing some of the stored concentrate with the distillate to produce a low calorie grape juice drink and further concentrating the first stage concentrate to produce a food product having a Baume above 35.

9 Claims, 2 Drawing Sheets

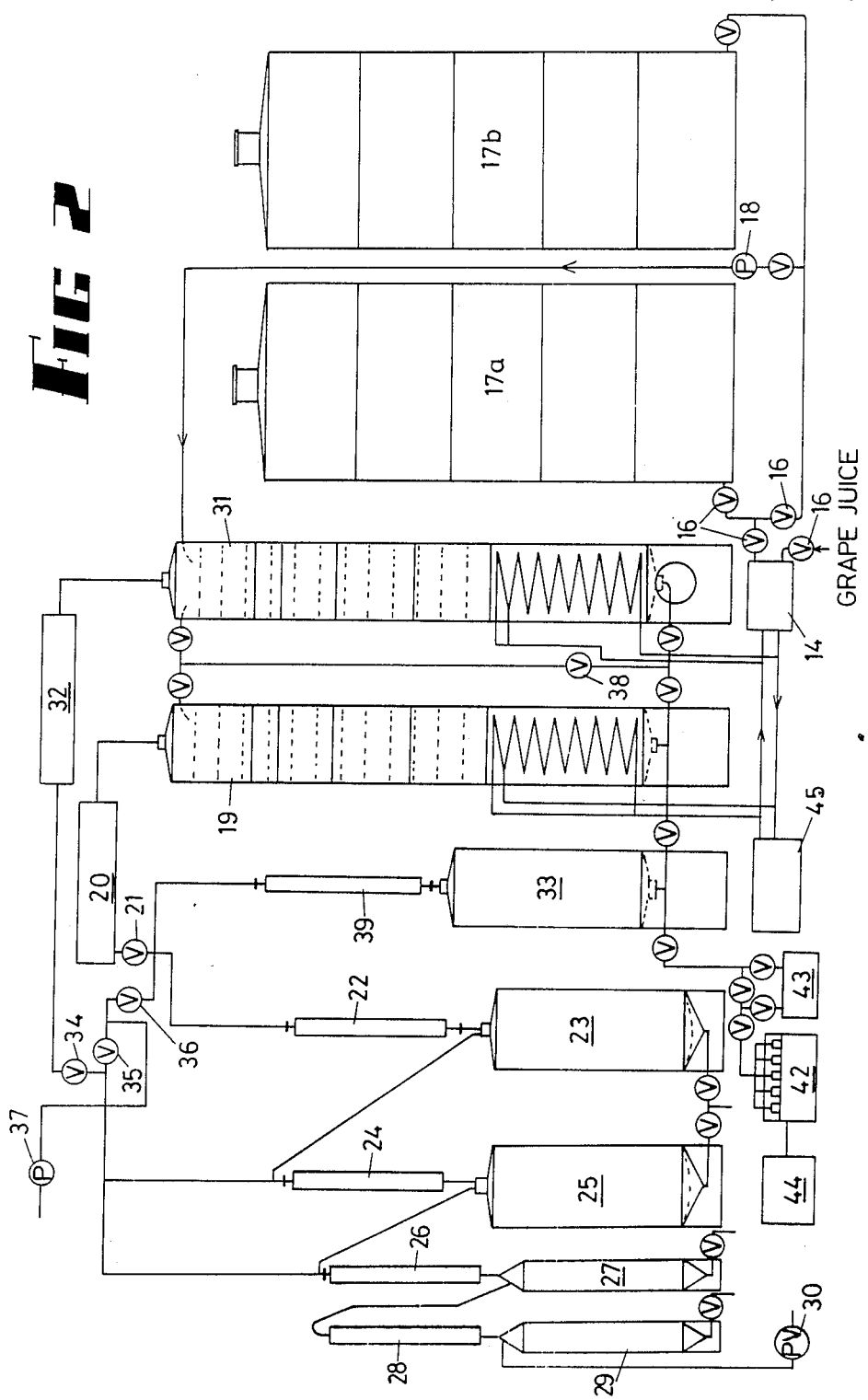

GRAPE JUICE CONCENTRATE AND DRINK

This invention relates to a method for producing a grape juice concentrate, and also for producing a grape juice drink.

It has been found that grape juice concentrate can simulate the flavour of honey, and the term "grape honey" has been applied to the product of this invention by those people who have sampled it. In fact it contains most of the constituents of honey, in most cases in somewhat similar proportions, but has the additional advantage over honey in that it is a very hygienic product, whereas honey, in being a vegetable product transmitted by insects, can be subject to various contaminants.

The invention also refers to a method of production of a palatable grape juice drink. Australian Patent No. 460403 in the name of the Inventor herein related to the production of a "low alcohol wine", and the product of that invention has proved very successful commercially. There is a demand for a low or zero alcohol wine having a great deal less sweetness than grape juice (desirably about 6 Baume compared with about 13), and the invention described in that patent achieved these results. Another object of this invention is to provide a method of production of such a beverage which is associated with the production of the grape juice concentrate exceeding 35 Baume.

PRIOR ART

Prior known to the Applicant includes in the Australian Patent Nos. 460403 and 460434, previous patents of the Inventor and referred to herein. Textbook art is described in Amerine et al. "The Technology of Winemaking", third edition by the AVI Publishing Co., Inc., Westport, Connecticut (pages 618–631) and HERSTEIN et al., "Chemistry and Technology of Wines and Liquors", second edition, D. van NOSTRAND & Co., Inc., New York, 1948 (pages 99–110 and 160–165). Reference can also be made to U.S. Pat. Nos. 1,362,870 to Johnson; 1,381,613 to Avis; 1,870,588 to Rooker; 2,016,584 to Ash; and 2,690,972 to Bradshaw. No prior art at all is known to the Applicant wherein a method of producing a grape juice concentrate and a grape juice drink comprises fermenting some of a grape juice residue and remixing the fermented residue with the distillate extracted from the grape juice before fermentation.

BRIEF SUMMARY OF THE INVENTION

In this invention, both a grape juice concentrate and a grape juice drink are produced by first preparing the raw material for a year's production during vintage, transferring grape juice so produced to a vacuum concentrating column before it ferments, heating the grape juice in the column and subjecting it to a low pressure (vacuum) to separate it into a distillate and a grape juice concentrate which has a Baume of about 35, separately storing the grape juice concentrate, remixing some of the stored concentrate with the distillate to produce a low calorie grape juice drink having a Baume between 4 and 8 and further concentrating the first stage concentrate to, produce a food product having a Baume above 35.

The distillate will have very little or no Baume at all, but the concentrate will have a Baume of about 35, and when portion of it is remixed with the distillate, it can provide a palatable drink which has a Baume of between 4 and 8, preferably about 6. In order to safeguard the 35 Baume raw material for the rest of the year's production of the two products, the first stage base material from both early and late vintage is allowed to ferment (it can drop to 25 Baume) and thereby provides a convenient method to preserve the base material for later use for the two products, after the alcohol has been extracted under vacuum.

The fermented grape juice provides a much more palatable grape drink with a wine character.

The stored concentrate need not be used soley for preparation of a grape juice drink. Alternatively it can ferment slowly and be used for grape juice concentrate and brandy.

After the vintage and during the next 11 months the concentrate is again put under vacuum and is separated from the alcohol which provides brandy, and also base product for the grape juice drink. After further concentration to above 35 Baume it is in turn bottled as a highly nurtitious grape juice concentrate (grape honey).

More specifically, a method of producing a grape juice concentrate and a grape juice drink comprises: (a) crushing grapes, and separating juice from pulp, (b) inhibiting fermentation of the grape juice and transferring the grape juice in an unfermented state to a vacuum concentrating column, heating the grape juice, subjecting the heated grape juice in the concentrating column to a sufficiently low pressure to separate it into a distillate and a first stage grape juice concentrate having a Baume of above 25, the distillate containing water and aromatics, (c) storing both the concentrate and distillate in separate containers, (d) remixing some of the concentrate with the distillate to produce a low calorie grape juice drink and (e) further concentrating the remaining first stage concentrate to a Baume exceeding 35.

The term Baume (or Brix) is a measure of sweetness which is commonly used in the wine industry. Pure water is regarded as having a Baume of 0, while a liquid having the same specific gravity as a 10% sodium chloride solution (1.074 to 20° C.) is regarded as 10 Baume. One degree of Baume is about 18 grams per liter of sugar.

The invention thus provides a method of preparing a large quantity of base material which can be made in a comparatively short time during vintage, and can come from surplus fruit which is frequently available. The base material can then be kept safely for the remainder of the year before it is utilised for the final products. It provides a cheap method to prepare and secure the grape sugar comprising fructose and glucose, necessary for the grape juice drink and also for the 53 Baume concentrate.

Fresh grape juice is extremely sensitive, subject to fermentation and therefore very difficult to preserve for a year's production of various grape products other than alcoholic. This invention provides a cheap method to solve that problem by the first stage concentration of the fresh juice to 35 Baume. It can then be stored and allowed to slowly ferment. Such fermentation provides protection from contamination and provides a protective $CO_2$ blanket for the ullage space, and the yeast also reduces the $SO_2$ added under the crusher to a harmless minimum for the subsequently produced brandy and grape juice concentrate.

It also provides a way to utilise the fruit for the full course of the harvesting season, using the early fruit which is low in sugar and high in acid for the nonalcoholic grape drink, and the later grapes very high in their natural fruit sugars for the grape honey having a Baume exceeding 35.

BRIEF DESCRIPTION OF THE DRAWINGS

An embodiment of the invention is described hereunder in some detail with reference to and as illustrated in the accompanying drawings, in which:

FIG. 2 illustrates diagrammatically the concentrating equipment which is used in the process.

Figure 1:
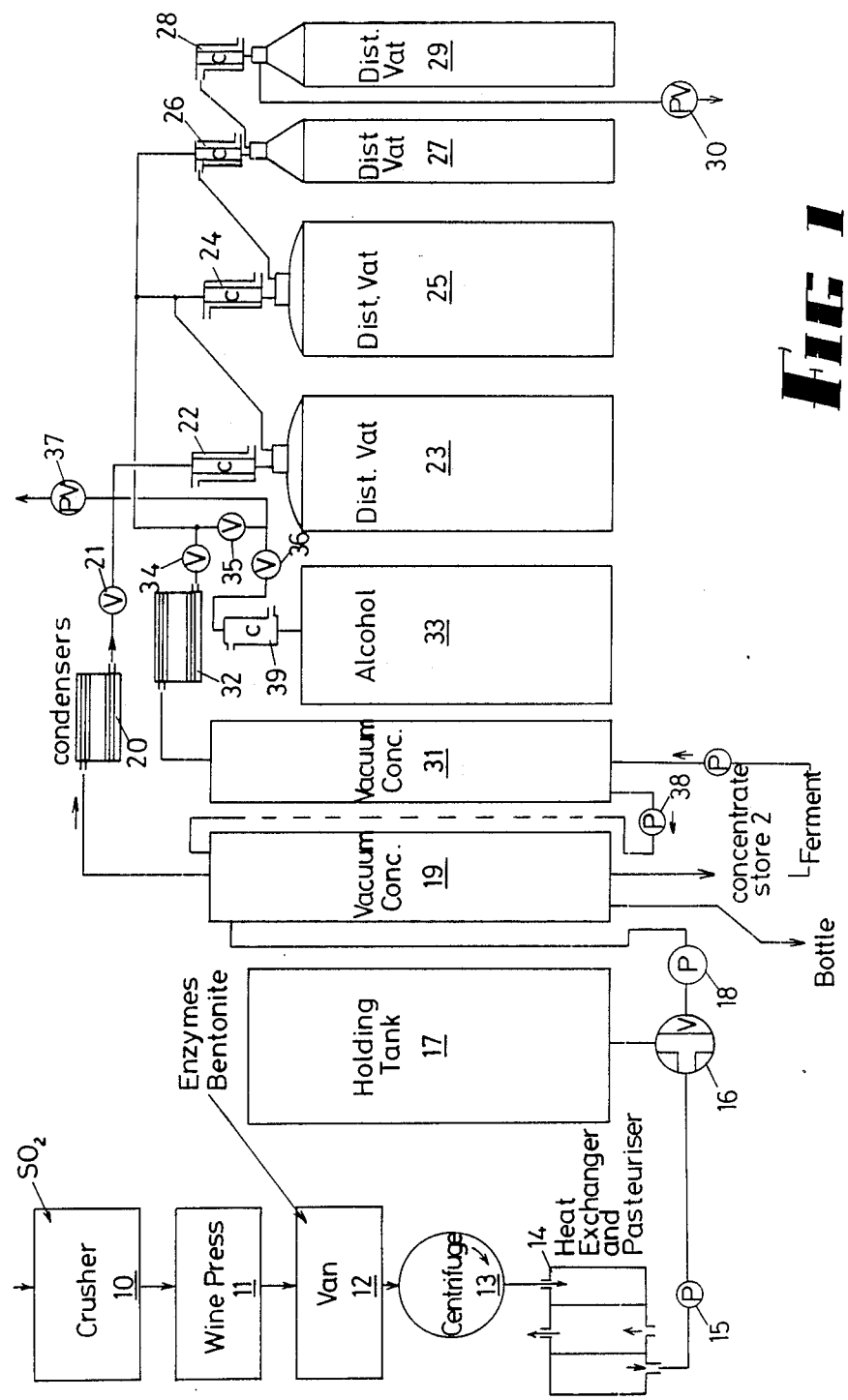
FIG. 1 illustrates diagrammatically the steps of the process.

The products of this embodiment are produced in two stages:

1. Production of Base Materials

Grapes are selected in the same way as they would be selected for the production of wine, that is, they are reasonably free of bad or damaged berries. They are fed to a crusher 10 and crushed with the addition of about 70 parts per million of sulphur dioxide and are immediately pressed in grape press 11 to separate the pulp (pips, skins and stalks) from the juice, which is then transferred to a vat 12 where enzymes and bentonite are added for clarifying and de-acidifying, as in a wine making process. In the vat 12, and in a subsequent centrifuge 13 (if used) the grape juice from the crushing is separated from the pulp via a wine press to assist in the expulsion of juice, but the process so far described is a standard winemaking process and is commonly used in the production of almost all wines.

The pre-pared grape juice is pumped by the pump 15 through a heat exchanger 14 into either one or both of the holding tanks 17a and 17b through the control valves 16. In the heat exchanger 14 the juice is heated to about 65° C. and thereby is pasteurized to prevent fermentation.

The pump 18 pumps the juice when required from the holding tanks 17a and 17b into the vacuum concentrating column 19 where it is subjected to partial vacuum while hot.

The heated grape juice in the vacuum concentrate column 19 is subjected to a sufficiently low pressure to separate it into a distillate and a first stage grape juice concentrate of 35 Baume. The first stage concentrate should not be less than 25 Baume. The distillate is carried through the condenser 20 the valve 21, and then progressively through the condenser 20 the valve 21, and then progressively through the condenser 22 (into distillate vat 23), 24 into distillate vat 25, 26 into distillate vat 27, and 28 into the distillate vat 29. These vats contain the grape juice and the aromatic distillates in varying degrees of aromas and provide the operator with an opportunity to subsequently blend the products.

However, this is the first stage of production of the base material comprising the distillates and a first stage concentrate which would normally be at 35 Baume. For the distillation process to be effected, the vacuum pump 30 retains a low pressure in the vats and also in the vacuum concentrating column 19.

The first stage products are then removed from the column 19 and from the vats and stored in stainless steel containers where they can remain for as much as 11 months.

2. Production of Brandy, Grape Juice Concentrate for Table Use and Low Calorie Grape Juice Drink The base materials from the first stage are mixed to provide the low calorie grape juice drink having a Baume of about 6. Some of the first stage concentrate having a Baume of about 35 may be used direct from the late vintage and mixed with grape juice distillate from an earlier vintage if required, but the later vintage concentrate can alternatively be fermented as described below.

The distillate will contain sufficient sulphur dioxide which was originally injected at the crushing stage, but carried over during distillation to provide it with full protection until used for grape juice blending.

The first stage concentrate of about 35 Baume which is not immediately used is stored and allowed to ferment. Because of its high Baume the fermentation will be a very slow process, but will initially provide a protective $CO_2$ blanket for its ullage space in the container in which it is stored, and the yeast required for fermentation will reduce the $SO_2$ content to a harmless level. Without this the $SO_2$ content degradation could take place and be detrimental to some subsequent products.

However the first stage concentrate as fermented will contain alcohol and its Baume will reduce to about 25%. This first stage concentrate is then pumped into the vacuum concentrating column 31, use being made of the vacuum pump 37 to place that column under subatmospheric pressure. The first stage concentrate is heated in the column 31 and the alcohol is passed through the condenser 32 and the secondary condenser 39 into the alcohol vat 33, the alcohol then being suitable for production of a high quality brandy. The higher temperature distillate is obtained by pumping the residual contents of the column 31 into the column 19 with the concentrate pump 38. Further concentration then takes place to remove the water and provide the required Baume above 35 which concentrate is then passed down from the column 10 into the bottling plant 42 (FIG. 2). The valves 34, 35 and 36 are used to control the flow of distillate from both the columns 31 and 19, the watery distillate being directed into the vats 23, 25, 27 and 29 as described above.

The bottling plant 42 is associated with a creaming plant 43 where the second stage concentrate product is creamed in the same way as natural honey. Labeling and packaging takes place at station 44. The steam boiler 45 provides the heat for the heat exchanger 14 and also for the columns 19 and 31.

A facility to store the distillate (which will not readily ferment) and also the concentrate provides the operator with a great deal of flexibility. He can for example extract additional sugar from the sweeter grapes which are available later during the vintage, providing a high Baume residue which will take a long time to ferment, and yet occupy only a small storage space. He will have different distillates for blending purposes, and the blending and production can take place throughout most of the year, both of the concentrate and also of the grape juice drink. The grape juice drink can contain a small quantity of alcohol if such is required, or can be completely free of alcohol when it is released from the second still 23. Since the remix is with the distillate from the grape juice, the reconstitution of the grape juice will result in a return of most of the original flavours, except that its sweetness will be largely reduced.

The distillate and concentrate of 35 Baume, of the early vintage where the grapes are still high in acid, are best used for the grape juice drink, and the concentrate at 35 Baume from the later vintage, when the sugar content is highest is best used for the further concentrate. The distillate from this later vintage concentrate is also used for the grape juice drink. Both these distillates have a high residual $SO_2$ content and thus can preserve themselves during storage time. Both concentrates of 35 Baume from the early and later vintage are stored away under slow preserving, fermenting conditions and are in turn used for the grape juice drink and for the concentrate after the alcohol has been extracted (for brandy) under vacuum conditions.

I claim:

1. A method of producing a grape juice concentrate and grape juice drink, comprising:
   (a) crushing grapes, and separating grape juice from pulp;
   (b) transferring the grape juice in an unfermented state to a vacuum concentrating column, heating the grape juice, subjecting the heated grape juice in the concentrating column to a sufficiently low pressure to separate it into a distillate and a grape juice concentrate having a Baume of above 25, the distillate containing water and aromatics;
   (c) storing both the concentrate and distillate in separate containers;
   (d) mixing some of the concentrate with the distillate to produce a low calorie grape juice drink having a Baume of between 4 and 8;
   (e) further concentrating at least some of the remaining concentrate to a Baume exceeding 35; and
   (f) fermenting the further concentrate from its Baume exceeding 35 to a Baume of less than 25.

2. A method according to claim 1 wherein the grape juice is heated in a heat exchanger for sufficient time and to a sufficient temperature to pasteurize it, and temporarily storing the grape juice in a holding tank before stage (b) of claim 1.

3. A method according to claim 1 wherein said fermented concentrate is further heated in a vacuum concentrating column, and alcohol vapour is condensed therefrom and stored in an alcohol vat.

4. A method according to claim 3 wherein said fermented concentrate is transferred to another vacuum concentrating column, and further heated to separate further distillate therefrom and again increase the Baume to above 35.

5. A method according to claim 1 comprising heating said grape juice drink to thereby pasteurize it, and packing while still hot from said further heating.

6. A method of producing a grape juice concentrate and a grape juice drink comprising:
   (a) crushing grapes in a wine press, and separating grape juice from pulp;
   (b) transferring the grape juice unfermented to a vacuum concentrating column, heating the grape juice in the column, subjecting the grape juice in the column to sufficiently low pressure to evacuate vapours therefrom, condensing the evacuated vapours as a distillate separated from a grape juice concentrate;
   (c) removing the grape juice concentrate from the column when it has a Baume of at least 35, storing the concentrate and allowing fermentation thereof while retaining a cover of $CO_2$ above the concentrate during its fermentation;
   (d) allowing the concentrate to ferment to about 25 Baume, distilling alcohol from the concentrate, remixing some of the alcohol reduced concentrate with some of said grape juice distillate in such proportions to provide a Baume of between 4 and 8;
   (e) heating the remixed concentrate and distillate; and
   (f) packing the remixed concentrate and distillate as a grape juice drink.

7. A method according to claim 6 further comprising storing said alcohol distillate in an alcohol vat.

8. A method according to claim 6 comprising further heating said concentrate, after said distillation of alcohol therefrom, under conditions of sufficiently low pressure to separate further distillate therefrom and increase Baume to above 35.

9. A method according to claim 6 further comprising adding $SO_2$ to the grapes as they are crushed in the wine press.

* * * * *